(12) United States Patent
Myaskouvskey et al.

(10) Patent No.: US 8,805,101 B2
(45) Date of Patent: Aug. 12, 2014

(54) CONVERTING THE FRAME RATE OF VIDEO STREAMS

(75) Inventors: Artiom Myaskouvskey, Qirjat Motzkin (IL); Evgeny Fiksman, Qirjat Yam (IL)

(73) Assignee: Intel Corporation, Santa Clara, CA (US)

( * ) Notice: Subject to any disclaimer, the term of this patent is extended or adjusted under 35 U.S.C. 154(b) by 1017 days.

(21) Appl. No.: 12/215,851

(22) Filed: Jun. 30, 2008

(65) Prior Publication Data

US 2009/0324115 A1 Dec. 31, 2009

(51) Int. Cl.
*G06K 9/36* (2006.01)

(52) U.S. Cl.
USPC ......................................................... 382/236

(58) Field of Classification Search
None
See application file for complete search history.

(56) References Cited

U.S. PATENT DOCUMENTS

| | | | | |
|---|---|---|---|---|
| 7,548,276 B2* | 6/2009 | Mizuhashi et al. | ........... | 348/459 |
| 7,586,540 B2* | 9/2009 | Ogino et al. | ................... | 348/448 |
| 7,609,763 B2* | 10/2009 | Mukerjee et al. | ........ | 375/240.16 |
| 7,630,438 B2* | 12/2009 | Mukerjee et al. | ........ | 375/240.16 |
| 2002/0036705 A1* | 3/2002 | Lee et al. | ...................... | 348/459 |
| 2003/0081144 A1* | 5/2003 | Mohsenian | ................... | 348/448 |
| 2003/0095205 A1* | 5/2003 | Orlick et al. | .................. | 348/448 |
| 2004/0208384 A1* | 10/2004 | Lin et al. | ....................... | 382/254 |
| 2004/0252759 A1* | 12/2004 | John Winder et al. | ... | 375/240.12 |
| 2006/0291561 A1* | 12/2006 | Seong et al. | ............ | 375/240.16 |
| 2007/0183497 A1* | 8/2007 | Luo et al. | ................. | 375/240.12 |
| 2007/0237225 A1* | 10/2007 | Luo et al. | ................. | 375/240.12 |
| 2008/0165851 A1* | 7/2008 | Shi et al. | .................. | 375/240.16 |
| 2008/0240241 A1* | 10/2008 | Mishima et al. | ......... | 375/240.15 |
| 2008/0284908 A1* | 11/2008 | Chang | ........................... | 348/452 |
| 2009/0059068 A1* | 3/2009 | Hanaoka et al. | ............. | 348/459 |
| 2009/0268088 A1* | 10/2009 | Zhou | ............................. | 348/452 |
| 2009/0316789 A1* | 12/2009 | Sasai et al. | .............. | 375/240.16 |
| 2011/0051003 A1* | 3/2011 | Zhou et al. | .................... | 348/576 |
| 2012/0169927 A1* | 7/2012 | Miki | ............................. | 348/451 |

OTHER PUBLICATIONS

"YUV Frame Rate Conversion (FRC) Technology", YUVsoft Corporation.
"Twixtor intelligently slows down, speeds up or changes the frame rate of your image sequences", Vision Effects, Inc. 2008.

* cited by examiner

*Primary Examiner* — Jingge Wu
(74) *Attorney, Agent, or Firm* — Trop, Pruner & Hu, P.C.

(57) ABSTRACT

A frame rate conversion may be done using a target image between a current and a previous image. A first motion field is estimated between the target image and the current image. A second motion field is estimated between the target image and the previous image. The motion fields are then used for motion compensation in the frame rate conversion.

15 Claims, 2 Drawing Sheets

CONVERTING THE FRAME RATE OF VIDEO STREAMS

BACKGROUND

This relates to frame rate conversion which changes the frame rate of an input video stream. To increase the frame rate, missing frames are reconstructed when needed by duplicating existing frames or interpolating from existing frames.

When a video scene includes significant moving objects, the human visual system tracks their motion. When the frame rate conversion operation uses frame duplication, the location of the objects in consecutive frames does not change smoothly, interfering with the human visual tracking system. This interference causes a sense of jumpy, non-continuous motion called "judder."

A significant motion causes a larger gap between the expected position and the actual position of the image in the series of frames, producing a larger judder artifact. Motion compensated frame rate conversion uses motion analysis of the video sequence to achieve high quality interpolation. Motion estimation involves analyzing previous frames and next frames to identify areas that have not moved. The accuracy of motion estimation is important for the quality of the output video stream. Motion compensation involves using motion vectors to predict picture element values. However, motion estimation algorithms are not perfect and motion compensation needs to have a mechanism to measure the quality of motion estimation and to be able to handle motion estimation errors.

DETAILED DESCRIPTION

Figure 1:
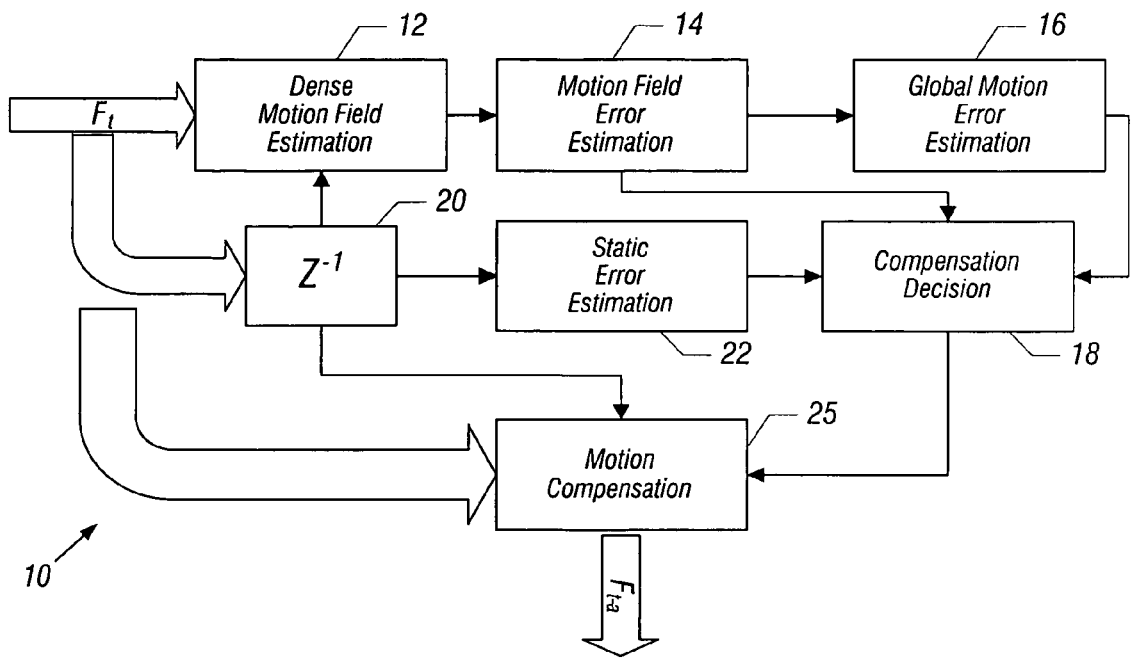
FIG. 1 is a schematic depiction of one embodiment of the present invention.

Referring to FIG. 1, an input frame $F_t$ may be provided to a dense motion field estimation unit 12. The dense motion field estimation unit 12 does a dense (for example, a per pixel) motion estimation from the target image to two known input images. The dense motion estimation uses the current frame ($F_t$) and a previous frame from buffer 20. Thereby, in some embodiments, more reliable motion field may result in improved occlusion handling and accelerated conversion.

Figure 2:
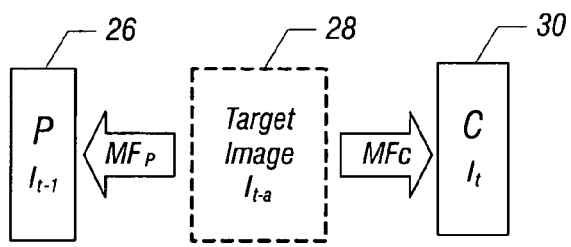
FIG. 2 is a depiction of the present invention in accordance with one embodiment.

As shown in FIG. 2, the result of the apparatus 10 is a frame $I_{t-a}$ (where 0<a<1) which corresponds to the target image 28. The target image 28 is intermediate between the current image 30 at time t and the previous image 26 at time t−1. The target image 28 has a motion field $MF_p$ between itself and the previous image 26 and a motion field $MF_c$ between itself and the current image 30. A "motion field" is an ideal representation of three dimensional motion projected on an image plane.

Motion field error estimation unit 14 then receives the output from the dense motion field estimation unit 12. The motion field error is estimated by applying warping or a motion compensated image using inverted motion vectors, on the original previous image 26 and current image 30 and then calculating pixel variation or the absolute value of differences. Thus, the local motion field error estimation is equal to the motion compensated image created from the previous frame and the corresponding motion field, $I_{t-1}^{MF_p^{-1}}$, minus the motion compensated image created from the current frame and the corresponding motion field, $I_t^{MF_c^{-1}}$. The result of this stage is a local motion field error picture. The output from the motion field error estimation unit 14 is then passed to the global error estimation unit 16 and the compensation decision unit 18.

Figure 3:
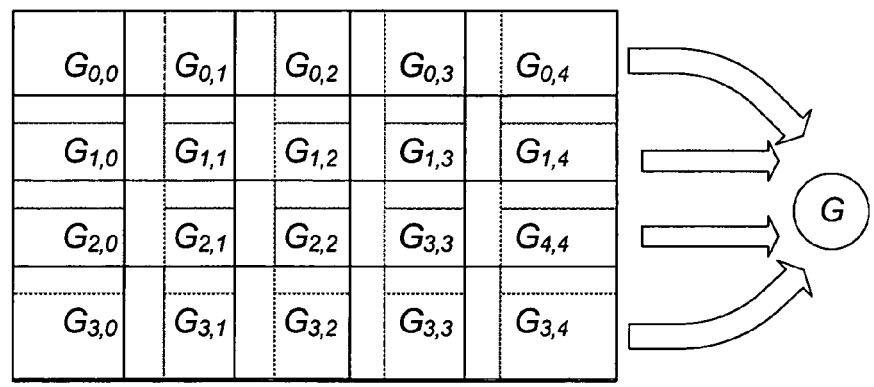
FIG. 3 is a schematic depiction of global error estimation of a motion field in accordance with one embodiment of the present invention.

The global motion field error estimation is calculated from local motion field error estimations from unit 14. The local motion field error picture is divided into overlapping regions. Statistical information about the error in each region is collected. Additional statistic methods are applied to this information in order to calculate the global motion field error G which is used by the compensation decision unit 18. As shown in FIG. 3, the global motion field error G is the result of all the errors of a plurality of regions within the frame.

Also contributing to the compensation decision 18 is the static error estimation 22 (FIG. 1). The static error estimation is an estimation of the static (motionless) error, which is the result of calculating pixel variation of the original frames. Thus, the static error is equal to the absolute value of the current image 30 minus the previous image 26.

The compensation decision unit 18 uses not only the local motion field confidence, but also uses the global estimation of the motion field quality. The higher value of global motion field quality may boost the local confidence values of the motion field, in some embodiments. In this way, the new output images may be smoother than the output image that uses only the local confidence measure.

The decision function is based on motion and static errors that were calculated for each pixel. The global motion field error value is used for motion field confidence adaptation. The local decision function is given by the following equation and is calculated per each pixel in a frame:

$$\alpha(x,y)=f(e_0(x,y),e_1(x,y),G),$$

where $e_0$ is a local motion field error value, $e_1$ is the local static error value, and G is the global estimation of motion field quality. The global motion field confidence G sets the final threshold values of a two-dimensional blending function.

Motion estimation methods have estimation errors due to occlusions and motion discontinuities. Therefore, a reliable compensation method should be applied during new frame construction. In this method, the pixels in an output frame are calculated by a weighted sum of the motion compensated and the static pixel values. The weights $\alpha(x,y)$ of the motion compensated and static pixels are based on two-dimensional blending function and calculated by the compensation decision 18. The motion compensated pixel value is a pixel value that is calculated under the assumption that the motion estimation at the given pixel is correct. The static pixel value is a pixel value that is calculated under the assumption of no motion of the given pixel. The chosen reference image is the one closest in time to the target image 28 in one embodiment. The target image pixels are calculated by one of the following equations, depending on the reference image:

$$I_{t-a}(x,y)=\alpha(x,y)\times I_{t-1}^{MF_p^{-1}}(x,y)+(1-\alpha(x,y))\times I_{t-1} \quad (1)$$

$$I_{t-a}(x,y)=\alpha(x,y)\times I_t^{MF_c^{-1}}(x,y)+(1-\alpha(x,y))\times I_t \quad (2)$$

Figure 4:
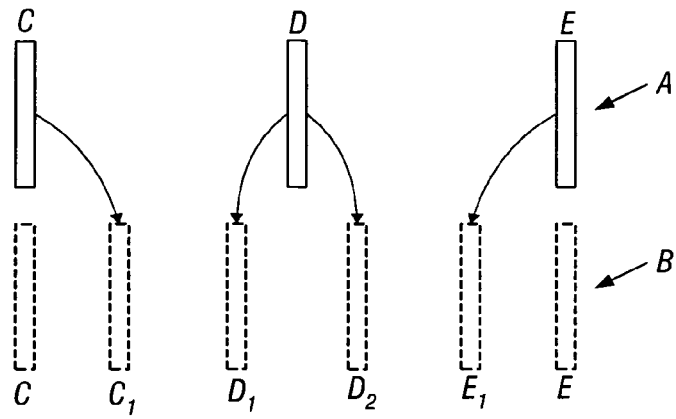
FIG. 4 is a depiction of a reference frame selection mechanism in accordance with one embodiment.

Thus, as shown in FIG. 4, a series A of 24 frames per second frames are converted into a series B of 60 frames per second frames. The first frame C is used to develop the interpolated frame $C_1$ and the second frame D is used to produce the interpolated frames $D_1$ and $D_2$. Likewise, the last frame E is used to interpolate the interpolated frame $E_1$ in the converted series B of frames.

Figure 5:
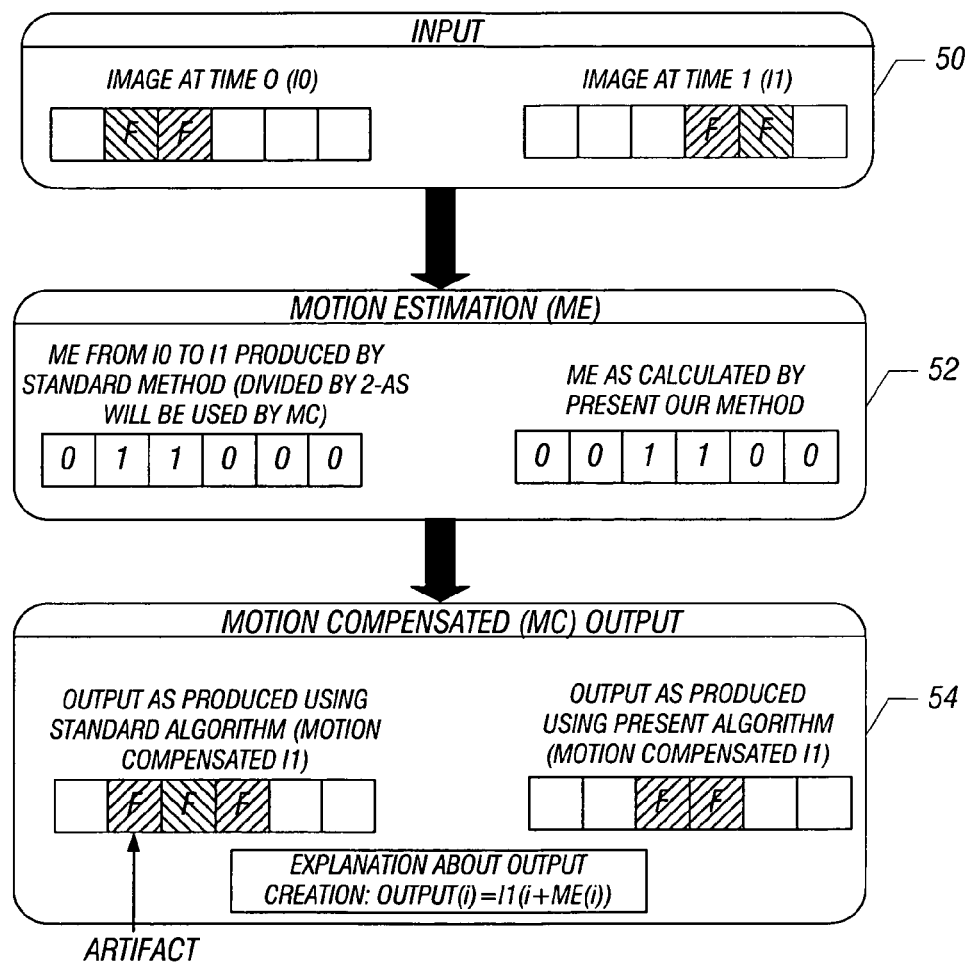
FIG. 5 is an illustration of the advantages of some embodiments of the present invention.

Thus, referring to FIG. 5, the bidirectional motion estimation improves accuracy of the motion field and, hence, gives better solutions for large displacements and occlusions in some embodiments.

As shown in FIG. 5, if the one-dimensional input image I0, at time zero has certain values, as indicated in block 50, and at time one image I1 has the values depicted, one-dimensional motion estimation provides the results shown in block 52. Note that the result calculated by the present method (on the right) produces an intermediate value between the image at time zero and the image at time one. The standard method simply recreates the same image.

The motion estimation result, shown in block 54, then creates the corrected image which is intermediate between the image at time zero and the image at time one in block 50. The output produced with the standard algorithm results in the artifacts shown on the left, as indicated in block 54. The output produced by the invention is on the right. The output at any given position 'i', OUTPUT(i), is equal to the reference image I1 at the position 'i' plus the offset given by the motion estimation at position 'i' or output[i]=I1[i+ME[i]].

Thus, in some embodiments, the present invention may provide better occlusion handling by using the bidirectional motion field and static information. It may provide a better solution for static text handling like titles. Visual artifacts caused by invalid static text handling may be reduced in some embodiments.

In some embodiments of the present invention, a dense motion estimation is calculated from the target unknown image located between two input images, whereas conventional approaches may calculate motion estimation from one input image to another. In addition, by considering motion estimation quality estimation over all images during the weighted interpolation of motion compensation, smoother outputs may be produced compared to standard motion compensation methods, in some embodiments.

The frame rate conversion depicted in FIG. 1 may be implemented in hardware, firmware, or software stored on a computer readable medium, such as an optical, magnetic, or semiconductor storage device, executed by a computer.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   locating a target image between a current image and a previous image;
   determining a motion field from the target image to the previous image;
   determining a motion field from the target image to the current image;
   using said motion fields for motion estimation in frame rate conversion; and
   determining a global motion error estimation, for each pixel in a frame, and determining a motion compensation by a compensation decision function as a function of a local motion field error value, a global estimation of motion field quality and a global motion field confidence value.

2. The method of claim 1 including determining a motion field estimation for each of a plurality of pixels.

3. The method of claim 2 including determining a motion field error estimation from the motion fields.

4. The method of claim 1 including using said motion field error estimation and the static error estimation to make a motion compensation decision for frame rate conversion.

5. The method of claim 4 including estimating the motion field error by subtracting from the motion compensated image of current frame and corresponding motion field, the motion compensated image of the previous frame and corresponding motion field.

6. The method of claim 1 including estimating the static error by subtracting the previous and current frames.

7. The method of claim 1 including increasing the frame rate by interpolating one or more missing frames from each existing frame.

8. An apparatus for frame rate conversion comprising:
   a motion field estimation unit to locate a target image between a current image and a previous image, determine a motion field from the target image to the previous image and a motion field from the target image to the current image and to use a weighted sum of motion compensated and motionless pixel values to construct a plurality of pixels in a target frame;
   a motion compensation decision unit to use the information from the motion field estimation unit to determine motion compensation; and
   a global motion error estimation unit to determine a global motion error estimation, for each pixel in a frame, and to determine a motion compensation by a compensation decision function as a function of a local motion field error value, a global estimation of motion field quality and a global motion field confidence value.

9. The apparatus of claim 8 wherein said motion field estimation unit to determine a motion field estimation for each of a plurality of pixels.

10. The apparatus of claim 8 including an error estimation unit to determine a motion field error estimation from the motion fields.

11. The apparatus of claim 10 including a unit for a static error estimation.

12. The apparatus of claim 11 wherein said motion field error estimation unit to estimate the motion of field error by subtracting the motion compensated image of the current frame to the corresponding motion field from the motion compensated image of the previous field and the corresponding motion field.

13. The apparatus of claim 11, said static error estimation unit to determine the static error by subtracting the previous and current frames.

14. The apparatus of claim 11, said compensation decision unit to use a weighted sum of motion compensated and static pixel values to construct a plurality of pixels in a target frame.

15. The apparatus of claim 8, said apparatus to increase the frame rate by interpolating one or more missing frames from each existing frame.

\* \* \* \* \*